Patented Sept. 28, 1948

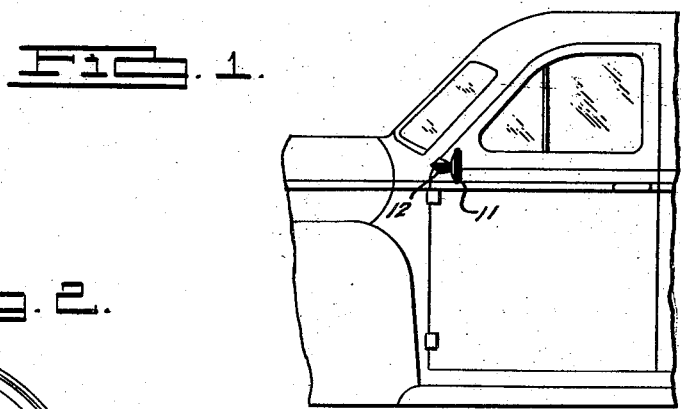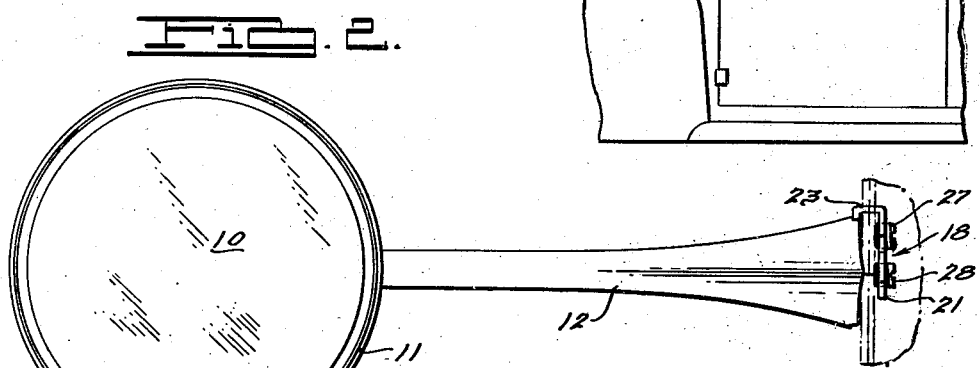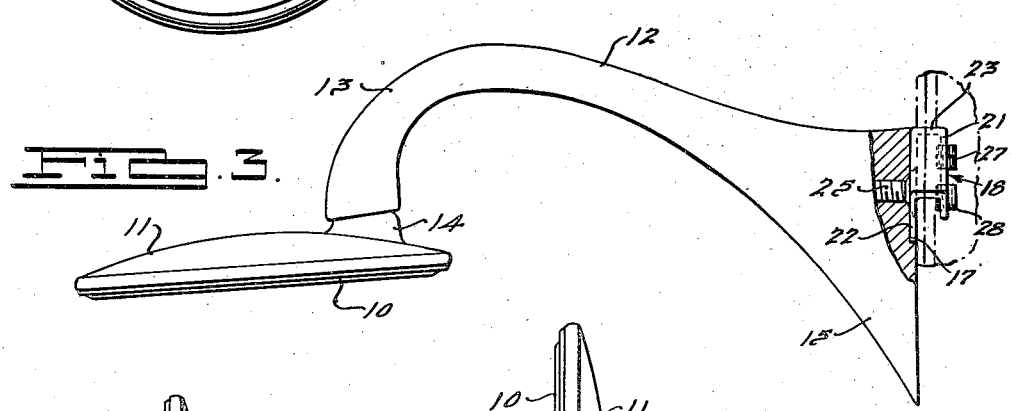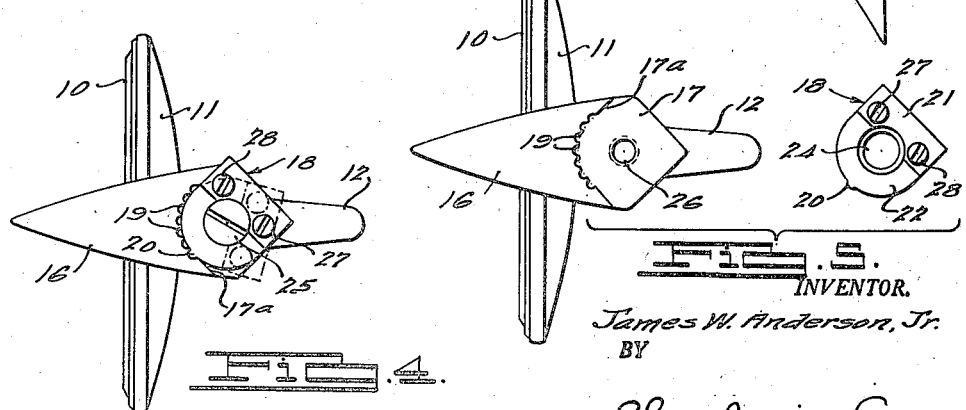

2,450,179

UNITED STATES PATENT OFFICE 2,450,179

REARVIEW MIRROR

James W. Anderson, Jr., Detroit, Mich., assignor to Monarch Governor Company, Detroit, Mich., a corporation of Michigan Application May 3, 1947, Serial No. 745,785

7 Claims. (Cl. 248—226)

1

The present invention relates to an improved outside mirror assembly which is useful on automobiles or other motor vehicles, the invention being especially applicable to a rear vision mirror attachable to the front upright edge of the vehicle door.

It is an object of the invention to provide an improved rear view mirror which, as a result of a simple arrangement of parts of its clamping or retaining means, may be attached to either side of a vehicle and, more particularly, to the upright front portion of a door located on either side of the vehicle body.

Another object of the invention is to provide a rear view mirror assembly having readily adjustable retaining means which may be placed at different angles for enabling the mirror to be mounted in a desired location and position on a vehicle door in spite of differences in the mirror supporting portion of that door such as differences in the angle of the door flange.

A further object of the invention is to provide an improved rear view mirror assembly of the foregoing general character which is very easy to adjust, which is simple in construction, which lends itself to mass production methods and, therefore, is economical to manufacture, which is pleasing in appearance, and which may be installed by using ordinary tools without drilling the vehicle body or carrying out other comparatively difficult operations.

Other objects of this invention will appear in the following description and appended claims, reference being had to the accompanying drawings forming a part of this specification wherein like reference characters designate corresponding parts in the several views.

Fig. 1 is a fragmentary side elevation of an automobile body equipped with an outside rear vision mirror assembly constructed in accordance with the present invention.

Figs. 2 and 3 are, respectively, a side elevation and a top plan view of the embodiment of the invention shown in Fig. 1, parts of a vehicle door being indicated in dotted lines and a portion of Fig. 3 being broken away to illustrate more clearly the means for attaching the mirror-supporting arm to the vehicle door.

Figs. 4 and 5 are end elevations of the mirror assembly mentioned above. These views illustrate the structure when detached from the vehicle, the dotted lines of Fig. 4 indicating one additional position for the adjustable clamping means, and Fig. 5 being an exploded view showing parts of the structure in a disassembled condition.

2

Before explaining in detail the present invention, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to the drawings, I have illustrated by way of example a rear vision mirror assembly embodying the present invention. This mirror assembly is adapted to be mounted on a flanged door of a vehicle such as the edge of the front door of an automobile body. While, in Fig. 1, I have shown the mirror assembly mounted at the lowest part of the inclined front edge of the vehicle door, it will be understood that the mirror may be mounted at any suitable point on that door as convenient or desired, because retaining or clamping means forming a part of the mirror assembly may be adjusted to permit the mirror to be mounted at the point selected. Also, I have illustrated the mirror assembly mounted on the left or "driver's" side of the vehicle, but it may be mounted on the other side as explained more fully hereinafter.

The mirror assembly includes a silvered glass or equivalent reflector 10 which is encased within and is retained by a metallic backing or shell 11. The reflector 10 may be held within the backing 11 by any suitable means, although I have preferred to turn the edge of the backing inwardly to form a flange adapted to engage a beveled edge of the reflector, as shown in Figs. 2 and 3. The backing or shell 11 containing the reflector 10 is carried by a supporting arm or bracket 12. This arm or bracket is preferably shaped to provide a curved outer end 13, best illustrated in Fig. 3, so that the reflector 10 will face rearwardly when the mirror assembly is mounted on the vehicle body. The reflector 10 and backing 11 may be mounted upon the arm 12 by any suitable means. However, I have preferred to employ pivotal attaching means such as a ball and socket joint so that the position of the reflecting surface will be adjustable in every direction and may be changed easily to suit the needs of the driver of the vehicle. This ball and socket joint is generally indicated at 14 and may be of any conventional type.

The arm or bracket 12 is shaped in the general way illustrated in Figs. 2 and 3 and provides supporting means for the backing 11 and reflector 10. The arm 12 is dimensioned to space the reflector 10 from the vehicle properly to permit the operator of the vehicle to look into the reflector conveniently. Furthermore, the arm 12 terminates at its inner end in a comparatively elongated base 15 (Fig. 3) having an end face 16 (Figs. 4 and 5) which is shaped to lie against the door of the vehicle while contacting the door smoothly but snugly. Furthermore, the base 15 is suitably contoured not only to provide a firm supporting means for the reflector 10, but also to provide a pleasing appearance for the entire mirror assembly. Accordingly, the base 15, as well as the other portions of the arm 12, are formed integrally and provide a continuous one-piece mirror support having attractive lines. While I have preferred to construct the bracket or arm 12 as explained, it will be understood that the contours or appearance of this bracket or its base, may be changed to suit the taste of the designer provided that the bracket is extensive enough to space the reflector from the car to the necessary extent and is adapted to support the mirror upon the vehicle body. However, the base of the bracket should be shaped and constructed to lie against the vehicle body without vibrating or otherwise undesirably rattling or moving.

The inner end 16 of the arm or bracket 12 is cut away or stepped to provide a recess or depressed portion 17 best shown in Fig. 5. This stepped portion or recess 17 is shaped to receive one arm of the generally U-shaped clamping member shown generally at 18. In the embodiment of the invention illustrated, this recess 17 is provided with a curved wall or shoulder 17a (Figs. 4 and 5), which is preferably shaped centrally in the form of an arc of a circle. The circle is centered at the axis of a threaded opening 26 and hence the clamping member 18 may rotate within the notched portion or recess 17 about a fastening element extending into the opening 26, as pointed out in greater detail hereinafter. Along the curved shoulder or wall 17a is disposed a plurality of indentations or notches 19 (Figs. 4 and 5). These notches are preferably, although not necessarily, rounded and are shaped to receive a projection or nib 20 extending from the outer arm or base 22 of the clamp 18. The projection 20 is adapted to be placed within any one of the notches 19 to assist in fixedly retaining the clamping member 18 in a desired angularly adjusted position with respect to the end face 16.

The generally U-shaped clamping member 18 is provided with an inner arm or flange 21 as well as the outer arm or base 22. The portions 21 and 22 are integral parts of the clamping member and are connected by a bridging portion 23 (Figs. 2 and 3). The clamp 18 is shaped to embrace the marginal flange of the vehicle door closely so that the inner arm 21 may engage one side of the door flange, the bridging portion 23 may extend over the edge of the flange, and the outer arm or base 22 may engage the other side of the flange in the manner indicated in Figs. 2 and 3. The base 22 of the clamp 18 is provided with a central opening 24 (Fig. 5) adapted to receive a fastening element for attaching the clamp 18 to the bracket 12. For example, the central opening 24 may be suitably dimensioned and countersunk so as to receive the screw 25 with the head of the screw lying flush against the surface of the arm or base 22 when the parts are assembled—see Figs. 3 and 4. When the clamp 18 is mounted in the depressed portion 17 it is secured in adjusted position by means of the fastening element or screw 25 which extends through the opening 24 and is threaded into the bore 26. The thickness of the base 22 of the clamp corresponds substantially to the depth of the depressed or recessed portion 17. When the clamp 18 is attached to the bracket 12, the nib 20 fits within one of the notches 19, depending upon the angular position which the clamp 18 occupies. The clamp 18 may be rotated or moved angularly in respect to the base 15 by adjusting the screw or fastening element 25 in the manner more fully pointed out hereinafter.

In order to attach the rear view mirror assembly to a vehicle body, the clamping member 18 is first adjusted angularly with respect to the end face 16 of the base 15. Assuming, for example, that it is desired to mount the mirror on the left door of the vehicle, the clamping member 18 is positioned approximately as shown in solid lines in Fig. 4. In other words, the bridging portion 23 and arms 21 and 22 are inclined to fit over the inclined door flange while positioning the base 15 and the mirror assembly in a generally horizontal position as shown in Fig. 1. Since the angle of the door flange may vary depending upon the place on the door at which the mirror is attached or depending upon the model or type of vehicle to which it is attached, it is necessary to adjust the position of the clamp 18 suitably for the particular installation in question. Thus, the fastening element or screw 25 is loosened to permit the clamp 18 to be rotated to change the angular position of the latter as necessary or desired. When the clamp 18 has been placed in a selected angular position, the projection or nib 20 is placed in the particular notch 19 which is appropriate. In Fig. 4, the nib 20 is shown placed in the lowest notch, but it could be placed in any one of the others. When the nib or projection 20 is placed in the selected notch, the screw or fastening element 25 is adjusted or tightened down. Generally speaking, the screw or fastening element 25 holds the clamp 18 to the arm 12 while the interlocking nib and notch prevent undesired angular movement of the clamp with respect to the arm 12. However, the screw 25 usually assists in fixedly securing the clamp 18 in its adjusted position since it is adapted to press it tightly against the base 15 of the arm 12.

After the clamp has been adjusted relative to the base in the manner explained, the mirror assembly is ready to be mounted upon the vehicle door. This may be accomplished by fitting the U-shaped clamp over the door flange. This clamp is shaped and constructed so that the inner arm 21 will rest against the inside of the flange, the bridging portion 23 will cross the edge of the flange, and the outer arm 22 will rest against the outer edge of the flange. In other words, the clamp 18 is formed to embrace the door flange closely. When the clamp 18 and the mirror assembly attached thereto are placed upon the vehicle door, suitable fastening elements associated with or carried by the inner arm 21 are adjusted to fix the entire mirror assembly in place. In the embodiment of the invention illustrated, these fastening elements comprise headless screws 27 and 28 which are threaded into suitable openings in the arm 21 and which may be tightened to bear against the inner side of the door flange for securing the mirror assembly to the door.

It will be noted that the fastening elements 27 and 28 are positioned on the inner side of the door flange and, accordingly, are accessible only when the door is open. As a result, the mirror assembly is installed when the door is open, and can be removed from the vehicle only if the door is open, so that it is virtually impossible to remove the mirror assembly when the car is locked. Furthermore, the fastening elements 27 and 28 are concealed from view most of the time, thus enhancing the pleasing appearance of the assembly. When the door is closed, the bridging portion 23 of the clamp 18 fits between the door jamb and the edge of the door flange, while the inner arm 21 of the clamp is positioned between the door flange and the adjacent flange of the pillar or post against which the door flange normally fits. Accordingly, the clamp 18 is tightly held in place between portions of the door and adjacent portions of the vehicle body, as well as being secured by the fastening elements 27 and 28.

If it is desired to detach or remove the mirror assembly from the vehicle body once it has been mounted thereupon, it is a simple matter to loosen the fastening members 27 and 28 and to slide the clamp 18 off of the marginal door flange when the door is open. Also, it is a comparatively simple matter to attach the mirror assembly to another vehicle or to another door on the same vehicle. In this case, the clamp 18 is adjusted to an appropriate angular position in the manner explained in detail above, the clamp 18 is relocated upon a door flange, and the fastening elements 27 and 28 are tightened to mount the mirror assembly in its new position. For instance, the mirror assembly illustrated in the drawings could be placed upon the right-hand door of a vehicle body by moving the clamping member 18 into substantially the position shown in dotted lines in Fig. 4. This could be accomplished by loosening the screw 25, lifting the projection 20 from the notch 19 in which it rested, and rotating the clamp 18 until it assumed the desired angular position. The screw 25 could then be tightened and the projection 20 placed in another of the notches 19. By this means, the angle of the clamp 18 would be correctly adjusted so that the mirror assembly could be mounted on the right side of the vehicle body in a position corresponding to the one it occupied on the left side thereof. In other words, the mirror can be mounted on any vehicle body or on any side of a vehicle so that the reflector will occupy a desired position for use as a rear view mirror.

I claim:

1. A mirror assembly for a vehicle having a door provided with a flange, which comprises a mirror-supporting arm, a clamping member mounted on the inner end of said arm and being shaped to embrace said flange, means for securing said clamping member to said flange, a fastening element for securing said clamping member to said arm while permitting angular movement of the former with respect to the latter, and locking means for preventing undesired angular movement of said clamping member, said locking means including cooperative notched and projecting elements for fixedly securing the clamping member in place in one of a plurality of angular positions on said arm.

2. A mirror assembly for a vehicle body having a door possessing a marginal flange, which comprises a mirror-supporting arm terminating at its inner end in a base having a surface shaped to contact said door smoothly, a portion of said surface being recessed, a clamp having a base mounted for angular movement within said recessed portion, said base having a thickness corresponding substantially to the depth of said recessed portion thereby to provide substantially a smooth continuation of said surface of said base, means for holding said clamp to said base while permitting said angular movement, and locking means for securing said clamp in a selected angular position.

3. A mirror assembly for a vehicle body having a door possessing a marginal flange, which comprises a mirror-supporting arm terminating at its inner end in a base adapted to lie against said door, a mirror carried by said arm at its outer end, the inner end of said base being stepped to provide a depressed portion, a U-shaped clamp having a portion extending into said depressed portion for angular movement therewithin, fastening means for detachably holding said clamp in place, and locking means for securing said clamp in a selected angular position, said fastening means and said locking means being adjustable to permit said clamp to be moved into a selected position and locked therein.

4. A mirror assembly for a vehicle body having a door possessing a marginal flange, which comprises a mirror-supporting bracket terminating at its inner end in a base having an end face adapted to lie against said door, a mirror carried by said arm at its outer end, a rounded recess in said end face, a generally U-shaped clamp having an arm fitted for rotation within said recess to permit the clamp to be moved to any one of a number of positions spaced radially on said end face, means for holding said clamp within said recess, and locking means for securing said clamp in one of said radially spaced positions, said locking means including a plurality of notches arranged about the rounded edge of said recess and also including a projection on said clamp dimensioned to fit within any one of said notches.

5. A mirror assembly for a vehicle body having a door possessing a marginal flange, which comprises a mirror-supporting bracket terminating at its inner end in a base having an end face adapted to lie against said door, a mirror carried by said arm at its outer end, a rounded recess in said end face, a generally U-shaped clamp having a rounded outer arm fitted within said recess and being shaped to embrace said flange with its inner arm fitted thereover, means associated with said inner arm for securing said clamp to said flange, a fastening element associated with said outer arm and said base for retaining said clamp within said recess, said fastening element being adjustable to permit rotation of the clamp, a plurality of notches arranged on an arc along the rounded edge of said recess, and a projection on the rounded portion of said outer arm, whereby said clamp may be rotated into any one of a plurality of desired angular positions and secured in place by adjusting said fastening element and placing said projection within an appropriate notch.

6. A mirror assembly for a vehicle body having a door possessing a marginal flange, which comprises a mirror-supporting bracket terminating at its inner end in a base having an end face adapted to lie against said door, a mirror carried by said arm at its outer end, a recess having an arcuately-shaped wall in said end face, a clamp having a first and a second arm, said first arm being arcuately shaped and possessing a central opening as well as being dimensioned to substantially fill said recess to provide a continuation of said end face, said second arm being shaped to fit snugly about said door flange, means associated with the second arm for fastening said clamp to said flange, a fastening element extending through said central opening and about which said clamp pivots, a plurality of notches formed within the arcuately-shaped wall of said recess, and a projection on the rounded portion of said first arm, said projection being adapted to extend into one of said notches for locking said clamp against undesired angular movement.

7. A mirror assembly for a vehicle body having a door possessing a marginal flange, which comprises a mirror-supporting bracket terminating at its inner end in a base having an end face adapted to lie against said door, a mirror carried by said arm at its outer end, a recess in said end face, a wall of said recess being arcuate in shape, a U-shaped clamp having one arm which is arcuate in shape and which possesses a central opening, said arm being dimensioned to substantially fill said recess and being shaped to provide a continuation of said end face, the second arm of said clamp being shaped to fit about said door flange, means associated with said second arm for fastening said clamp to said flange and being accessible to secure said clamp in place only when said door is open, a screw passing through said central opening in said first arm and being threaded into said base, a plurality of adjacently positioned rounded notches formed in the arcuate wall of said recess, and a nib extending from the rounded edge of said first arm and shaped to fit into any one of said notches, whereby said clamp may be rotated into any one of a plurality of desired angular positions and secured in place by tightening and loosening said screw and placing said nib within an appropriate notch.

JAMES W. ANDERSON, Jr.

REFERENCES CITED

The following references are of record in the file of this patent:

UNITED STATES PATENTS

| Number | Name | Date |
|---|---|---|
| 2,321,861 | Sauer | June 15, 1943 |